United States Patent

Forlani et al.

[15] 3,691,401

[45] Sept. 12, 1972

[54] CONVERTIBLE NAND/NOR GATE

[72] Inventors: Franco Forlani, Rho; Gianpiero Rodari, Milan, both of Italy

[73] Assignee: Honeywell Information Systems Italia, Milan, Italy

[22] Filed: March 10, 1971

[21] Appl. No.: 122,714

[52] U.S. Cl. ..................307/215, 307/207, 307/251, 307/304

[51] Int. Cl. ........................H03k 19/34, H03k 19/36

[58] Field of Search...............307/207, 215, 251, 304

[56] References Cited

UNITED STATES PATENTS

| | | | |
|---|---|---|---|
| 3,515,901 | 6/1970 | White | 307/215 |
| 3,348,064 | 10/1967 | Powlus | 307/215 X |
| 3,406,298 | 10/1968 | Axelrod | 307/215 X |
| 3,475,621 | 10/1969 | Weinberger | 307/215 |
| 3,479,523 | 11/1969 | Pleshko | 307/251 X |
| 3,510,787 | 5/1970 | Pound et al. | 307/207 X |
| 3,582,683 | 6/1971 | Podraza | 307/251 |
| 3,394,267 | 7/1968 | Schmidt | 307/215 |

*Primary Examiner*—Stanley T. Krawczewicz
*Attorney*—Fred Jacob, Ronald T. Reiling and Lewis P. Elbinger

[57] ABSTRACT

A novel integrated circuit element for use as a dual functioning NAND/NOR gate for a digital data processing circuit is herein disclosed. The integrated circuit element contains a first set of field effect transistors that can be operatively connected in either series or parallel to thus perform a NAND or NOR function on any inputed signals. The operative interconnections are implemented by a second set of field effect transistors which provide either the series or parallel interconnections by appropriately responding to a command signal.

8 Claims, 8 Drawing Figures

Franco FORLANI
Gianpiero RODARI
INVENTORS

By [signature]
ATTORNEY

Franco FORLANI
Gianpiero RODARI
INVENTORS

By [signature]
ATTORNEY

Franco FORLANI
Gianpiero RODARI
INVENTORS.

By [signature]
ATTORNEY.

CONVERTIBLE NAND/NOR GATE

BACKGROUND OF THE INVENTION

The present invention relates to an integrated circuit employed in digital data processing, and, more particularly, to a variable NAND/NOR gate.

Previously, logic functions were implemented within a digital circuit by the use of three basic types of gating, namely, AND, OR and NOT. These gating circuits were usually obtained by assembling and connecting discrete components, i.e., transistors, diodes, resistors, etc. This was often done without even realizing that the three basic logic gates were being utilized to obtain the desired logic function.

The early technique of implementing logic functions by multiples of the basic types of gating later gave way to using only one type of gate. This singular type of gate approach allowed for standardization, design automation, cost reduction, and predictable behavioral characteristics. Known single types of gating techniques include NOR or NAND logics which exclusively use either OR — NOT or AND — NOT gates respectively.

The use of a single type of gating (i.e., NOR or NAND logics) frequently requires a number of additional elements that could be saved if it were possible to use a single gating circuit that could function both as a NAND gate and a NOR gate. These large numbers of additional elements increase the cost of the overall circuitry and also introduce some delay since every gate has its own (even if small) operation time.

SUMMARY OF THE INVENTION

The present invention overcomes such disadvantages by providing a single integrated circuit element that is capable of functioning as either a NAND gate or a NOR gate for the variables applied to its logical inputs. The NAND or NOR functional operation is designated by a command variable applied to a command input. This integrated circuit element is obtained by using field effect transistors, "FET," of the MOS type. According to the invention, a number of field effect transistors are interconnected in such a manner to be identifiable as main transistors and auxiliary transistors. The main transistors connect to logic inputs and the auxiliary transistors connect to at least one command input. The auxiliary transistors are either in a conductive or isolation state that is dependent upon the command input level. The state of the auxiliary transistors governs the manner in which the main transistors are interconnected so as to effectuate either a NAND or NOR function by the resulting circuit connections. A particular circuit having three logic inputs, a command input and an output will be disclosed within the Description of the Preferred Embodiment. It will be shown how either a NAND or a NOR function of the input variables can be obtained by varying the command input.

It should be noted that the circuit of this invention is prepared according to integrated circuit techniques and that the addition of the auxiliary transistors does not significantly add to the production cost. This is due to the fact that the number of deposit or diffusion operations will not vary as a result of adding these auxiliary transistors. These transistors are also quite small and when deposited by the MOS technique result in a negligible addition of structure.

These and other characteristics and advantages of the invention will be understood from the following detailed description of a preferred embodiment of the invention itself.

DESCRIPTION OF THE PREFERRED EMBODIMENT

Figures 1, 2, 8:
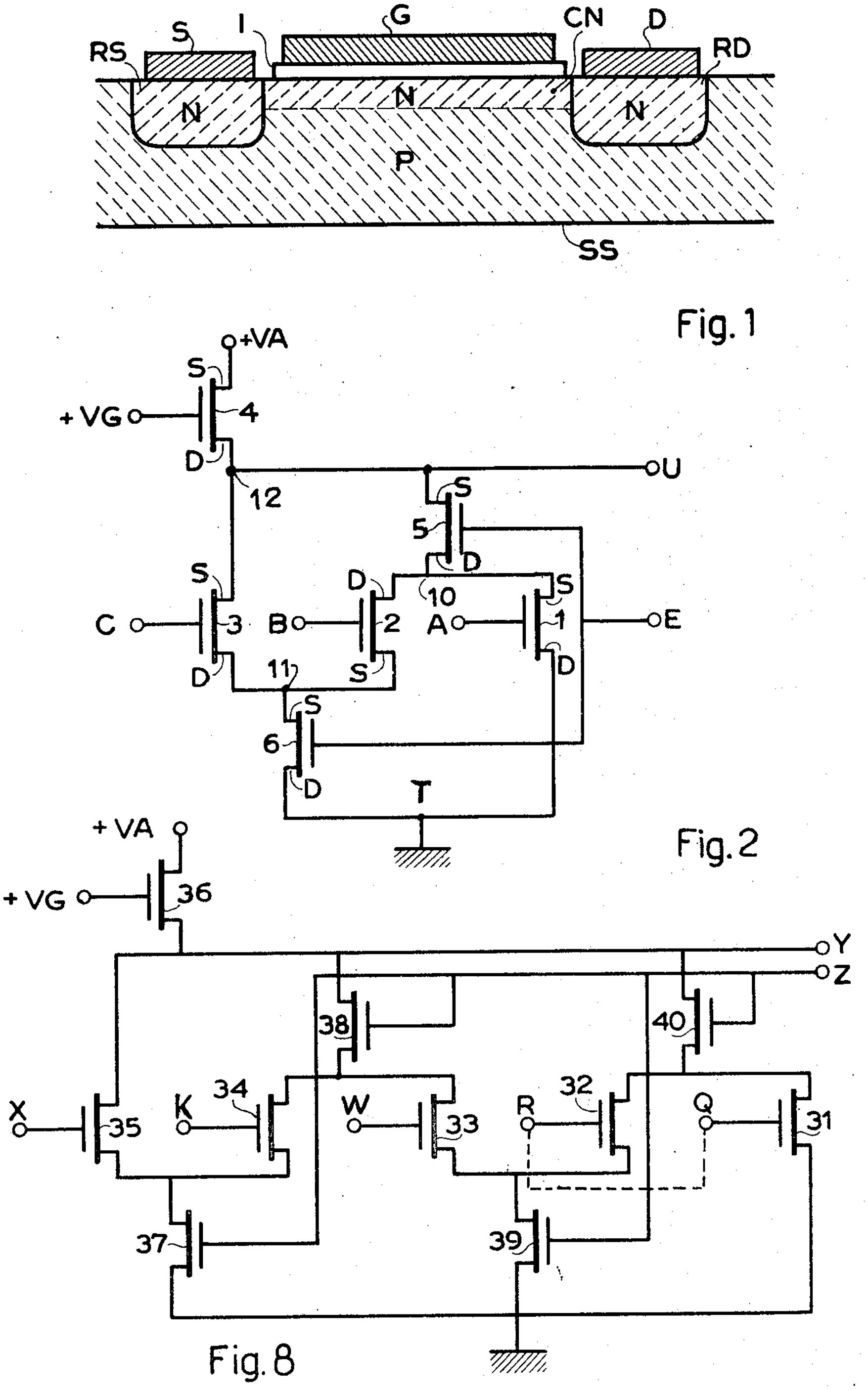
FIG. 1 represents schematically the section of a field effect transistor of the MOS type.
FIG. 2 represents the wiring diagram of a three input circuit element according to the invention.
FIG. 8 represents the logic diagram for a five-input circuit element according to the invention.

FIG. 1 depicts a section of a field effect transistor fabricated according to the MOS technique. It includes a semiconductor substrate of the P type and two semiconducting regions RS and RD both of the N type. Two metallic electrodes S and D are in ohmic contact with these regions, one of these is called the Source and the other the Drain. Between the regions RS and RD is a control electrode G which is, separated from the semiconductor underneath by a thin insulating layer I.

Under normal conditions, an applied voltage between electrodes S AND D will not result in any current flow because one of the two junctions between the regions of type N and the substrate P is back biased. However, if a positive voltage (which exceeds a defined threshold voltage) is applied between the electrode G and support SS, the region between RS and RD is filled with negative carriers. This results in the formation of a channel CN of type N that conductively connects the two regions RS and RD. Thus, the region between the electrodes S and D can act as either an insulator or a conductor depending on the applied voltage across electrode G and support SS.

It may be noted that the operation of a field effect transistor is perfectly symmetric and that the functions of the two electrodes, S and D may be mutually exchanged. It will be assumed, in the following, discussion that normally the electrode S is at a certain positive voltage with respect to the electrode D. It will also be assumed that the field effect transistor is off when the command electrode G is at a null voltage (O V.) and that it is on when the command electrode G is at a certain positive voltage. A ZERO logic level is assumed to correspond to OV. A ONE logic level is assumed to correspond to a given positive voltage (e.g., 6V). Finally, it is necessary to note that in connecting a command electrode of a field effect transistor to a suitable voltage VG, a defined resistance will be obtained between S and D. This results in a resistance limiting of the circuit current between S and D.

FIG. 2 presents the diagram of a NAND — NOR gate with three logic inputs and a command input. The three logic inputs A,B,C are connected to the three command electrodes of the three main transistors 1,2 and 3. A fourth transistor 4 has its command electrode connected to a fixed biasing voltage +VG and therefore works as a current limiting resistance. The electrode S of transistor 4 is connected to a power supply positive voltage +VA, while the electrode D of transistor 1 is connected to a ground T. The output U is connected to a point 12, which is both common to electrode D of transistor 4 and electrode S of transistor 3. In addition, it is connected to electrode S of the auxiliary transistor 5, whose electrode D is connected to point 10 which is common to both electrode D of transistor 2 and electrode S of transistor 1. Finally, point 11 which is common to both electrode D of transistor 3 and electrode S of transistor 2 is also connected to electrode S of transistor 6, whose other electrode D is grounded. The command electrodes of the two transistors 5 and 6 are connected to each other and to the command input E.

When the logic value ZERO, corresponding to OV. is applied to command input E, the two transistors 5 and 6 go off resulting in the four transistors 1,2,3 and 4 being connected in series. This results in a NAND function of the three inputs A,B and C. In fact, it is sufficient for one of the inputs A,B, and C to be at a ZERO level thus causing the corresponding transistor to be off and therefore isolating point 12 from ground. The output U goes to a positive voltage value, i.e., a logic level ONE when point 12 is so isolated. If *a,b*, and *c*, are the binary variables of the inputs A,B, and C and u is the value of the variable at the output U, then according to Boolean algebra:

$$u=\overline{a\,b\,c}=\bar{a}+\bar{b}+\bar{c}$$

When a ONE value (i.e., a positive potential) is applied to command input E, the two transistors 5 and 6 are on which results in point 10 being connected to the output and point 11 being connected to ground. Taking into account the symmetry which is peculiar to FET transistors, it may be seen that the three transistors 1,2 and 3 are parallel connected between output and ground. Under this condition, the circuit performs a NOR function of the inputs. In fact, it is sufficient for only one of the inputs A,B and C to be at a ONE level to have the output at a ZERO level:

$$u=\overline{a+b+c}=\bar{a}\cdot\bar{b}\cdot\bar{c}$$

Figure 4:
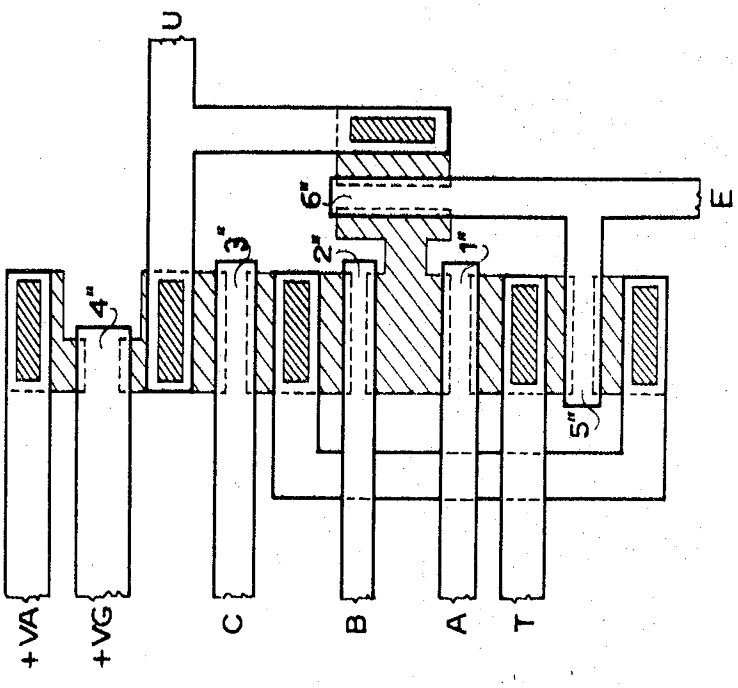
FIGS. 3 and 4 schematically show two examples of the integrated circuit element according to the invention.
Figure 3:
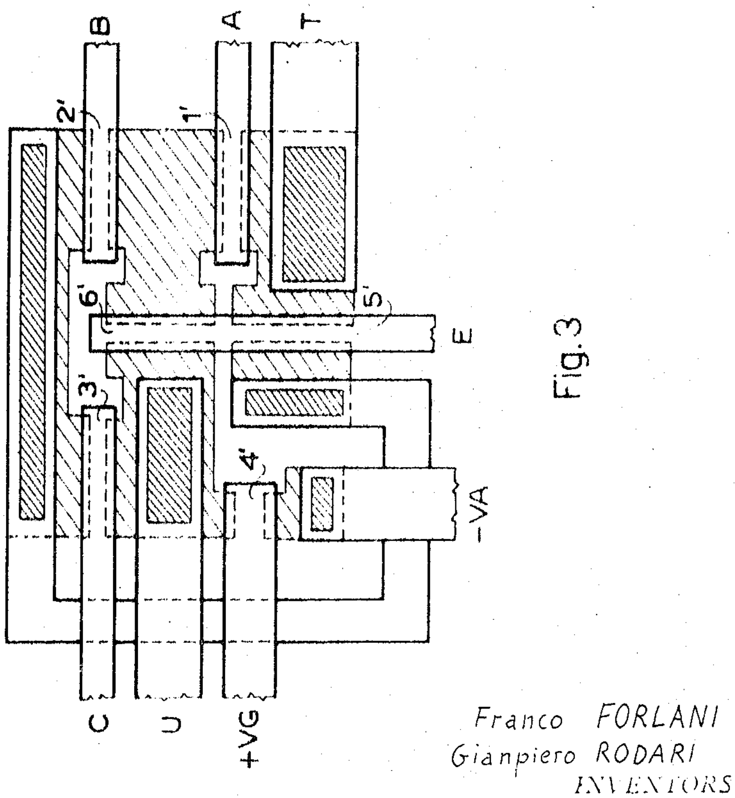

FIGS. 3 and 4 are two examples of how to obtain the integrated circuit unit of this invention. In these figures, metallic straps as represented by the thicker lines from both the electrodes and the interconnections. The source and drain semiconductor regions are represented by the thin lines, and the spaced hatching. The various superposed layers must be considered as being insulated from one another and from the substrate below. This is done by the interposition of insulating layers (not shown) except for the areas indicated by the thick hatching, which represent the ohmic contact areas between the conductor electrodes and the semi-conducting region underneath. The numbers 1' — 6' and 1'' — 6'' indicate the respective zones under the command electrodes of transistors 1 — 6 of FIG. 3. The references A,B,C; E,U,T + VA and +VG indicate the logic inputs, the command input, the ground, and the power supply conductors respectively and have the same letters as the corresponding elements of FIG. 3. As can be seen, a number of electrodes and semiconducting regions are used as source electrode and source region for one transistor and as drain electrode and drain region for an adjacent transistor. This grouping of many elements into a small space plus the multiple or shared usage of various semiconducting regions by more than one transistor is easily accomplished by the MOS Technique. This means that only a little additional space is needed for the auxiliary transistors of this invention.

The possibility of transforming an integrated circuit element from a NOR gate to a NAND gate and vice versa through the application of a command signal has many applications. This is true whether the command signal is itself part of the data or a previously set hardware signal that presets the circuit to always function as either a NOR or NAND gate. Thus, the logic designer has greater freedom in that he may either preset the circuit or allow it to vary according to the command input function. This eliminates the need for one or more logic elements, i.e., inverters and therefore cuts down on space and cost while increasing operational speed. This is particularly important in the case of the MOS elements which are generally intrinsically slower than other semiconductor switching elements.

Figure 5:
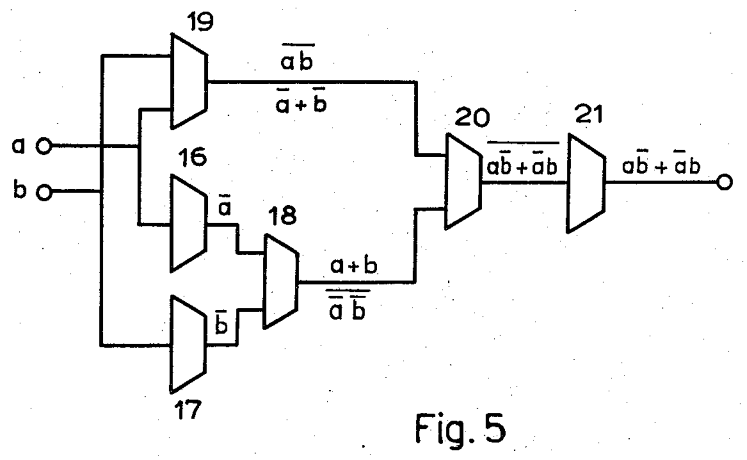
FIG. 5 shows the logic diagram for implementing a particular function using the NAND logic according to the prior art.
Figure 7:
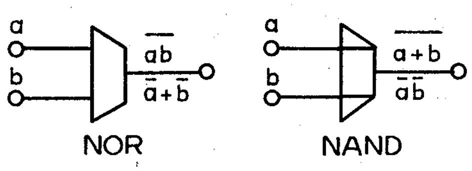
FIG. 7 defines the symbols used in the previous two figures.

The following case shows the aforementioned possibilities and advantages of the subject invention. Let us assume that it is desired to implement the logic function $S=\bar{a}b+a\bar{b}$ wherein only the two variables a and b are available and not their respective inversions. The function S is, in this case, the exclusive OR of the variables a and b and the circuit for this function is known as the half-adder circuit. FIG. 5 gives the logic diagram for normally implementing the S function using NAND logic. It is to be noted that the NAND gate symbology used in FIG. 5 is set out and defined in FIG. 7.

FIG. 5 logic begins with a NAND gate 19 used to obtain the NAND function of the inputs a and b and a set of INVERTER gates 16 and 17 that operate on a and b respectively to obtain the inversions thereof. The inverted variables $\bar{a}$ and $\bar{b}$ obtained from INVERTERS 16 and 17 are inputed to a NAND gate 18. The output from gate 18 is $\overline{ab}=\bar{a}+\bar{b}=p$ and the output from gate 19 is $\overline{\bar{a}\bar{b}}=a+b=q$. These outputs, $p$ and $q$, are applied as inputs to NAND gate 20 from which the following is outputed: $u=\overline{pq}=\overline{(\bar{a}+\bar{b})\cdot(a+b)}=\overline{\bar{a}b+a\bar{b}}$. This output is next inverted through INVERTER 21 to obtain the desired function $S=\bar{a}b+a\bar{b}$.

Figure 6:
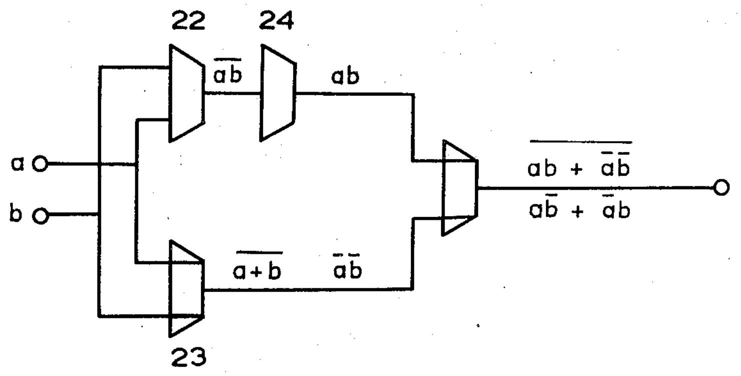
FIG. 6 represents the logic diagram for implementing the same function using NOR and NAND elements according to the present invention.

FIG. 6 shows the same function S, implemented through the use of the NOR and NAND gates of this invention. It is to be noted at this time that the logic symbols for the NOR and NAND gates are defined in FIG. 7. The logic of FIG. 6 begins with the variables a and b being inputed to both the NAND gate 22 and the NOR gate 23. The respective outputs from these gates are $x=\overline{ab}$ and $y=\overline{a+b}$. The variable, $x=\overline{ab}$ is next inverted to $\bar{x}=ab=\bar{a}+\bar{b}$ by the INVERTER 24 and applied along with y to the inputs of a NOR gate 33. The resulting output from the NOR gate 33 is:

$$S=\overline{\bar{x}+y}=x\bar{y}=(\bar{a}+\bar{b})(a+b)=\bar{a}b+a\bar{b}.$$

It is thus seen that the FIG. 6 logic employs two less inverters and one less switching level on each of the circuit branches than is shown for the FIG. 5 logic. These savings result in increased overall speed of the logic.

FIG. 8 shows a circuit with five inputs Q,R,W,K and X to five main transistors 31,32,33,34 and 35. A transistor 36 is seen to function as a current limiting resistor in the same manner as the transistor 4 in FIG. 2. Auxiliary transistors 37,38,39 and 40 function in response to a command input Z in the same manner as did the counterpart auxiliary transistors of FIG. 2. The output Y generates a NAND function or a NOR function depending on the binary level of the command input Z.

It is seen that the number of main transistors (or integrated circuit element inputs) is limited only by: (1) the maximum allowable resistance in the series connected situation and (2) the minimum allowable resistance in the parallel connected situation. These resistance evaluations are usually governed by carefully selecting the size of the cross-sectional area of the conduction channels between the source and the drain regions. In addition, it is also possible to vary the biasing voltage, VG, with the change in the binary command signal logic level. The biasing voltage when applied to the particular transistor sets up a current limiting resistance. This resistance is then adjusted by varying the biasing voltage according to the connection mode of the main transistors. It is seen from the discussion of FIGS. 2 and 8 that the number of main transistors (or logic inputs) must always be odd, i.e., three, five, seven etc. If all of the logic inputs are not used, then two or more of them, i.e., adjacent transistors may be connected together and thereby function as only a single input. This is shown by the dotted line between R AND Q in FIG. 8.

Having described the invention, what is claimed as new and secured by Letters Patent is:

1. A logic element for use in digital data processing comprising:

input means for receiving a plurality of binary signals;

controllable circuit means coupled to said input means for applying a result of a logic NAND operation, performed on said binary signals, to an output terminal in response to a first command signal and for applying a result of a logic NOR operation, performed on said binary signals, to said output terminal in response to a second command signal; and command input means, coupled to said circuit means for receiving control signals, said command input means producing said first command signal and said second command signal in response to said control signals.

2. The logic element of claim 1 wherein said circuit means comprises:

a plurality of main transistors of the field effect type, each of said main transistors having a command electrode coupled to said input means; and a plurality of auxiliary transistors of the field effect type, each of said auxiliary transistors having a command electrode coupled to said command input means for receiving said first and said second command signals to enable said auxiliary transistors in response to said second command signal, and to disable said auxiliary transistors in response to said first command signal.

3. An integrated circuit element including transistors of a field effect type fabricated according to a metal-oxide-semiconductor technique comprising:

at least a first main transistor, a second main transistor and a third main transistor, wherein command terminals of said main transistors receive binary logic signals, and wherein said first main transistor has a first source/drain electrode coupled to an output terminal, a second source/drain electrode of said first main transistor is coupled to a first source/drain electrode of said second main transistor, a second source/drain electrode of said second main transistor is coupled to a first source/drain electrode of said third transistor and a second source/drain electrode is coupled to a ground terminal; and at least a first auxiliary transistor and a second auxiliary transistor, wherein command electrodes of said auxiliary transistors receive control signals, wherein a first source/drain electrode of said first auxiliary transistor is coupled to said ground terminal and a second source/drain electrode is coupled to said second source/drain electrode of said first main transistor, and wherein a first source/drain electrode of said second auxiliary transistor is coupled to said output terminal while said second source/drain electrode of said second auxiliary transistor is coupled to said first source/drain electrode of said third main transistor, wherein a first control signal causes a binary "0" logic signal at said output terminal when binary "1" logic signals are applied to all of said main transistor command electrodes, and wherein a second control signal causes a binary "0" logic signal at said output terminal when a binary "1" logic signal is applied to any of said main transistor command electrodes.

4. An integrated circuit of claim 3 further comprising:

a reactance coupled between said output terminal and a power supply for limiting current.

5. An integrated circuit of claim 4 wherein said reactance is comprised of a transistor.

6. An integrated circuit element including transistors of a field effect type fabricated according to a metal-oxide-semiconductor technique comprising:

at least one first auxiliary transistor for receiving control signals at command electrodes, wherein said first auxiliary transistor is coupled to an output terminal;

at least one second auxiliary transistor for receiving said control signals at a command electrode, wherein said second auxiliary transistor is coupled to a ground terminal; and a plurality of main transistors for receiving binary logic signals at command electrodes, wherein each main transistor has a first and a second source/drain electrode, a first electrode of a first main transistor being coupled to said output terminal, and a second terminal of a last main transistor being coupled to said ground terminal, each first auxiliary transistor being coupled to two first electrodes of said main transistors, each second auxiliary transistor being coupled to two second electrodes of said main transistors, wherein a first control signal causes said output terminal to be a binary "0" signal when all of said binary logic signals are binary "1" signals, and wherein a second control signal causes said output terminal to be a binary "0" signal when any of said binary logic signals are binary "1" signals.

7. The integrated circuit of claim 6 further comprising a reactance for limiting current, coupled to said output terminal and adapted to be coupled to a power supply.

8. The integrated circuit of claim 7 wherein said reactance is a transistor.

* * * * *

UNITED STATES PATENT OFFICE
CERTIFICATE OF CORRECTION

Patent No. 3,691,401 Dated September 12, 1972

Inventor(s) Franco Forlani, et. al.

It is certified that error appears in the above-identified patent and that said Letters Patent are hereby corrected as shown below:

On the cover sheet, in the heading, insert -- [30] Foreign Application Priority Data Mar. 12, 1970 Italy 21813-A/70 -- .

Signed and sealed this 20th day of March 1973.

(SEAL)
Attest:

EDWARD M.FLETCHER,JR.
Attesting Officer

ROBERT GOTTSCHALK
Commissioner of Patents